(12) United States Patent
Pleune et al.

(10) Patent No.: US 7,455,136 B2
(45) Date of Patent: Nov. 25, 2008

(54) COOLING SYSTEM FOR A REARWARD PORTION OF A VEHICLE AND METHOD OF COOLING

(75) Inventors: Jeffrey M. Pleune, Rochester HIlls, MI (US); David A. Young, Huntington Woods, MI (US); Gregory A. Major, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 300 days.

(21) Appl. No.: 11/213,410

(22) Filed: Aug. 26, 2005

(65) Prior Publication Data

US 2006/0048984 A1 Mar. 9, 2006

Related U.S. Application Data

(60) Provisional application No. 60/608,636, filed on Sep. 9, 2004.

(51) Int. Cl.
*B60K 11/02* (2006.01)
(52) U.S. Cl. .................................. 180/68.1; 165/41
(58) Field of Classification Search ................ 180/68.1, 180/68.2, 68.4, 68.6; 165/41, 43
See application file for complete search history.

(56) References Cited

U.S. PATENT DOCUMENTS

| | | | | |
|---|---|---|---|---|
| 3,494,413 | A * | 2/1970 | Dixon | 62/513 |
| 4,267,895 | A * | 5/1981 | Eggert, Jr. | 180/68.1 |
| 4,664,074 | A * | 5/1987 | Otani et al. | 180/68.4 |
| 5,373,892 | A * | 12/1994 | Johnson et al. | 180/68.4 |
| 6,213,233 | B1 | 4/2001 | Sonntag et al. | 180/65.2 |
| 6,394,210 | B2 * | 5/2002 | Matsuda et al. | 180/68.1 |
| 6,427,770 | B2 * | 8/2002 | Beck et al. | 165/203 |
| 6,443,253 | B1 | 9/2002 | Whitehead et al. | 180/68.1 |
| 6,450,275 | B1 * | 9/2002 | Gabriel et al. | 180/65.4 |
| 6,467,286 | B2 * | 10/2002 | Hasebe et al. | 62/185 |
| 6,651,761 | B1 * | 11/2003 | Hrovat et al. | 180/65.3 |
| 6,705,101 | B2 | 3/2004 | Brotz et al. | 62/198 |
| 6,732,827 | B2 * | 5/2004 | San Miguel | 180/242 |
| 6,772,602 | B2 | 8/2004 | Vetter et al. | 62/239 |
| 6,932,148 | B1 * | 8/2005 | Brummett et al. | 62/239 |
| 7,025,159 | B2 * | 4/2006 | Smith et al. | 180/68.1 |

\* cited by examiner

*Primary Examiner*—Frank B Vanaman

(57) ABSTRACT

A cooling system dedicated to cooling the vehicle components located in the rearward portion of a vehicle is provided. The rear-dedicated cooling system operates independently of any cooling systems located in a frontward portion of the vehicle. The rear-dedicated cooling system may be subdivided into high temperature and low temperature cooling circuits. A method of cooling a vehicle is also provided.

14 Claims, 4 Drawing Sheets

COOLING SYSTEM FOR A REARWARD PORTION OF A VEHICLE AND METHOD OF COOLING

CROSS REFERENCE TO RELATED APPLICATIONS

This application claims the benefit of U.S. Provisional Application 60/608,636, filed Sep. 9, 2004, which is hereby incorporated by reference in its entirety.

TECHNICAL FIELD

The invention relates to cooling systems for cooling vehicle components.

BACKGROUND OF THE INVENTION

Numerous components on a vehicle generate heat in performing their intended functions. Accordingly, cooling systems are provided that typically include a liquid coolant directed past the heat-generating components to transfer the excess heat to a heat-dissipating component, such as a radiator. Outside air is then directed over the radiator to lower the coolant temperature and the coolant is then re-directed to the heat-generating component, creating a cooling circuit. Cooling systems are typically designed with a single radiator, centrally located in a frontward portion of the vehicle.

SUMMARY OF THE INVENTION

A cooling system is provided that is dedicated to cooling vehicle components located in a rearward portion of the vehicle and operates independently of one or more separate cooling systems that cool vehicle components located in a frontward portion of the vehicle. The rear-dedicated cooling system is especially beneficial on vehicles that have rear traction system propulsion motors (e.g., wheel motors), power electronic devices, and/or batteries located in the rearward portion of the vehicle.

Accordingly, a cooling system for a vehicle includes a heat-generating component and a heat-dissipating component mounted in a normally rearward or downwind portion of the vehicle. As used herein, "normally rearward portion" means a portion of the vehicle disposed toward the rear when the vehicle is in forward drive mode (i.e., rearward of a transverse centerline of the vehicle such that it is nearer a rear end of the vehicle than a front end of the vehicle). Because it is rearward, this portion is also generally "downwind" during forward motion of the vehicle. Preferably, the heat-generating component and the heat dissipating component are located substantially rearward of rear wheels on the vehicle. "Normally frontward or forward portion" means a portion normally disposed toward the front as the vehicle is in forward drive mode.) The normally frontward portion is forward of the transverse centerline of the vehicle. Coolant is circulated through coolant flow passages, such as hoses, to transfer heat between the heat-generating component and the heat-dissipating component. An air inlet in series air flow relationship with the heat-dissipating component provides outside air to the heat-dissipating component in order to cool it. Notably, the coolant flow passages and the air inlet are also in the rearward portion of the vehicle. The proximity of the coolant flow passages and air inlet (as well as any associated coolant temperature sensors, coolant reservoirs and air flow ducts) to the heat-generating components to be cooled may enable improved cooling performance, as the rear-dedicated heat-dissipating component may be "customized" in size and position for optimal cooling of the rearward components. Additionally, the closer proximity may permit shorter flow passages and a smaller radiator than one designed to cool all (both front and rear) vehicle components, both of which may enable vehicle mass reduction. Finally, because separate radiators are used for front and rear components (rather than one radiator to cool all components), the radiators may be smaller in size than a single radiator design, thus enabling greater packaging flexibility.

In one aspect of the invention, the heat-dissipating component is a radiator that is disposed generally horizontally. Horizontal packaging of the radiator enables additional placement options, such as beneath the floor of the vehicle.

In yet another aspect of the invention, the heat-dissipating component is a radiator module having a first radiator and a second radiator. The first radiator dissipates heat from relatively low temperature coolant that is transferred from a relatively low temperature heat-generating component such as a battery. The second radiator dissipates heat from relatively high temperature coolant that is transferred from a relatively high temperature heat-generating component such as a rear traction motor. The radiator module further includes at least one fan that pulls outside air through the air inlet onto the first and second radiators. Optionally, the first and second radiators are generally horizontally stacked above the fan.

In still another aspect of the invention, the rear-mounted heat-generating component may be one or more of a rear traction motor, a battery for buffering fuel cell output and capturing regenerative energy, a power module interfacing with the battery to provide the battery power to the rear traction motor, a power inverter module for inverting battery power between direct current and alternating current, or a distribution unit for distributing power to the rear traction motor.

In a further aspect of the invention, heat-generating components that create relatively high temperature coolant flow may be separated from other rearward portion heat-generating components that create relatively low temperature coolant flow. In that case, a second heat-dissipating component may be mounted in the normally rearward portion of the vehicle and additional structure defining separate coolant flow passages operable for transferring heat from the relatively higher temperature heat-generating components may be fluidly connected to the second heat-dissipating component. Preferably, the coolant flow passages for the lower temperature heat-generating components are interconnected with the coolant flow passages for the relatively higher temperature heat-generating components only via a common coolant flow reservoir. This minimizes coolant flow mixing between the two sets of coolant flow passages. Separating the relatively higher temperature heat-generating components from the relatively lower temperature heat-generating components in this manner effectively creates two separate rear-dedicated cooling circuits. Notably, the same air inlet may be operable to provide outside air to both of the heat-dissipating components provided for the two separate rear-dedicated circuits. The air inlet may be formed by body structure such as a vehicle rear quarter panel, a rear panel or the vehicle roof. A duct may extend from the air inlet to the heat-dissipating component to direct cooling air over the heat-dissipating component. A second duct may extend from the radiator module to an air exit.

In a still further aspect of the invention, a frontward or forward portion cooling circuit includes a heat-generating component and a heat-dissipating component, both mounted in the frontward portion of the vehicle, as well as structure defining coolant flow passages also located in the frontward portion and operable to transfer heat between the frontward mounted heat-generating component and heat-dissipating component. Structure located in the normally frontward portion defines another air inlet to provide outside cooling air to the frontward portion heat-dissipating component for cooling thereof. The frontward or forward portion air inlet may be formed by a front grille disposed on a forward face of the vehicle. The frontward or forward portion cooling circuit is not in substantial (i.e., thermally significant) coolant flow communication with the rearward portion cooling circuit. As used herein, substantial or thermally significant coolant flow communication means that more than 10% of coolant mass flow per unit of time is shared between the frontward portion and rearward portion cooling circuits. Preferably, coolant mixing between the two circuits is near zero.

In another aspect of the invention, the vehicle may be a fuel cell powered vehicle or a hybrid electro-mechanical powered vehicle; in this instance, the heat-generating component located in the frontward portion may be a fuel cell or an internal combustion engine, respectively.

A method of cooling vehicle components on a vehicle characterized by a frontward portion and a rearward portion is provided. The method includes installing at least one heat-dissipating component in the rearward or downwind portion. The method further includes fluidly connecting the rearward portion heat-generating component with at least one heat-dissipating component located in the rearward portion to establish a first coolant flow circuit. The method further includes providing a first air inlet formed by rear vehicle structure that is operable to deliver outside air to the rearward portion heat-dissipating component for cooling thereof.

In one aspect of the invention, the method includes categorizing at least two rearward portion (also referred to herein as downwind) located heat-generating components into a first group characterized by heat generation causing the coolant flow to be a relatively low temperature and a second group characterized by heat generation causing the coolant flow to be a relatively high temperature. Preferably, the heat-dissipating components installed in the rearward portion include at least two radiators. The method may further include fluidly connecting the first group of heat-generating component(s) to a first of the radiators via first flow passages. The method may further include fluidly connecting the second group of heat-generating component(s) to a second of the radiators via second flow passages.

In addition to cooling components located in the rearward or downwind portion via the method described above, the method may also involve the cooling of components located in the frontward or forward portion. For instance, the method may include installing at least one heat-dissipating component in the frontward or forward portion. The method may further include fluidly connecting at least one heat-generating component located in the frontward portion with the frontward portion heat-dissipating component to establish a second (i.e., frontward portion) coolant flow circuit. Preferably, the frontward portion coolant flow circuit and the rearward portion coolant flow circuit or circuits are not in thermally significant coolant flow communication with one another. The method may further include providing a second air inlet formed by front vehicle structure that is operable for delivering outside air to the frontward portion heat-dissipating component for cooling thereof.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
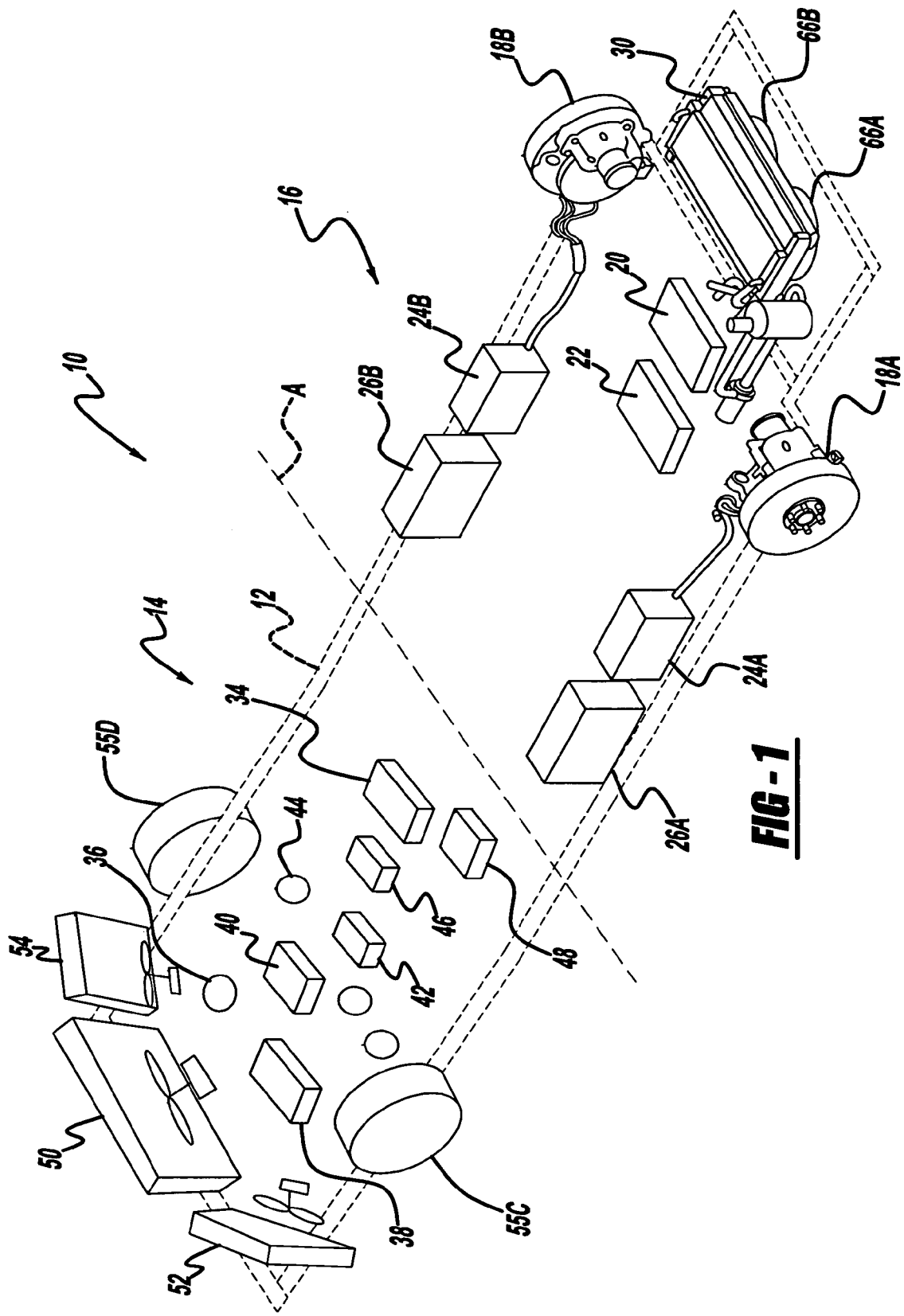
FIG. 1 is a schematic perspective illustration of a vehicle in partial phantom view characterized by a frontward portion and a rearward portion and including heat-generating components as well as heat-dissipating components in both the frontward portion and the rearward portion.

Referring to the drawings, wherein like reference numbers refer to like components, FIG. 1 shows a vehicle 10 formed by frame structure 12. The vehicle 10 is represented by a generally frontward portion 14 and a generally rearward portion 16 distinguishable from one another by an imaginary, generally centrally located transverse dividing line A. Both the frontward portion and the rearward portion include a variety of heat-generating components as well as heat-dissipating components, all of which are supported by vehicle structure such as the frame structure 12. For instance, the rearward portion 16 includes electric traction wheel motors 18A and 18B. A traction battery 20 which may be nickel metal hydride (NIMH), lithium ion (LiIon) or another type of battery, is also located in the generally rearward portion 16 and is used for buffering fuel cell output (if the vehicle 10 is a fuel cell vehicle) and for capturing regenerative energy. A distribution unit 22, a pair of power inverter modules 24A and 24B as well as a pair of auxiliary power modules 26A and 26B are operatively connected to the traction battery 20 and to the distribution unit 22 and are used in selectively powering the traction wheel motors 18A and 18B. As will be readily understood by those skilled in the art, the distribution unit 22 distributes power from the battery 20 to other vehicle systems. The power inverter modules 24A and 24B convert the DC current (DC) provided by the battery 20 into alternating current (AC). The accessory power modules 26A, 26B contain a power supply that interfaces with the battery 20 to energize various vehicle components such as the traction wheel motors 18A and 18B. Importantly, the rearward portion 16 also includes a heat-dissipating component in the form of radiator module 30 which acts to dissipate the heat generated by the heat-generating components, namely the rear motors 18A, 18B, the traction battery 20, the distribution unit 22, the power inverter modules 24A, 24B and the auxiliary power modules 26A, 26B.

Like the rearward portion 16, the frontward portion 14 includes a variety of heat-generating components such as a vehicle powering component 34 which may be, for example, an internal combustion engine, a hybrid electro-mechanical internal combustion engine and electric motor assembly, or a fuel cell stack. A variety of other forward portion heat-generating components are located on the vehicle 10, such as an air compressor motor 36, a stack compressor controller 38, a coolant heater 40, an electric traction system controller (ETSC) 42 for front traction, a front electric traction system (ETS) 44 operable for converting electrical power providing the powering component 34 into rotary motion for driving front wheels 55C, 55D, a charge air cooler (CAC) 46 for cooling air used by the vehicle powering component 34, as well as a power distribution and control module (PDCM) 48. Those skilled in the art will readily understand the function of such components. A variety of heat-dissipating components including a central stack radiator 50 and left and right radiators 52, 54 are also mounted in the frontward portion 14 and are operable for cooling the heat-generating components 34-48 of the frontward portion 14.

Rear-Dedicated Cooling System

Figure 2:
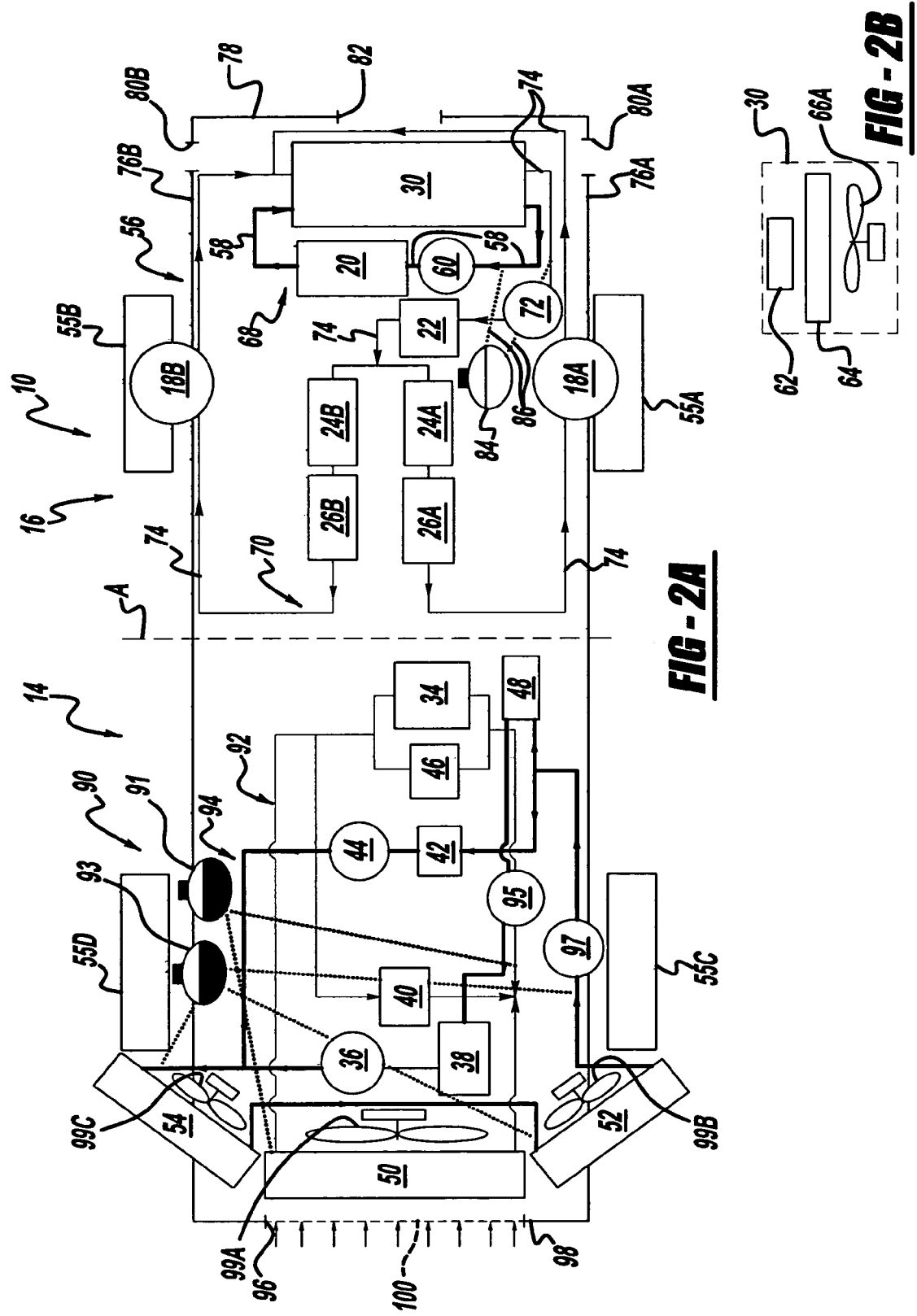
FIG. 2A is a schematic bottom view illustration of the vehicle of FIG. 1 illustrating frontward portion and rearward portion cooling systems for the heat-generating and heat-dissipating components of the vehicle.
FIG. 2B is a schematic side view representation of a radiator and fan module included as a rearward portion heat-dissipating component in FIG. 2A.

Referring to FIG. 2A, vehicle 10 is supported by wheels 55A-D. Wheels 55A and 55B are operatively connected to electric traction wheel motors 18A and 18B, respectively. The vehicle 10 includes a rear-dedicated cooling system 56 operable to cool the rearward portion heat-generating components 18A, 18B, 20, 22, 24A, 24B, 26A and 26B. The rear-dedicated cooling system 56 includes low temperature coolant flow passages 58 which circulate coolant between the traction battery 20 and the radiator module 30. A battery coolant pump 60 maintains appropriate coolant flow through the low temperature coolant flow passages 58.

Referring to FIG. 2B, the radiator module 30 is composed of a battery radiator 62 as well as a rear traction radiator 64. Each of the radiators has a core of winding coolant tubes arranged to create an inlet face and an outlet face, as will be well understood by those skilled in the art. The battery radiator 62 is stacked with respect to a rear traction radiator 64. The radiator module 30 also includes at least one and preferably two radiator module cooling fans 66A and 66B (shown in FIG. 1) that pull cooling air across or through the battery radiator 62 and the rear traction radiator 64 for dissipating heat from the coolant flowing therethrough. An inlet face of the battery radiator 62 receives the outside cooling air. The fans 66A, 66B pull the air through the radiator core of coolant tubes to an outlet face which is adjacent an inlet face of the rear traction battery 64. The fans 66A, 66B then pull the air through the radiator core of coolant tubes of radiator 64 to an outlet face of radiator 64, to be exhausted below the module 30 (i.e., below the vehicle 10). Alternatively, the fans may be located above the radiators 62, 64 to push air across the radiators 62, 64. Referring again to FIG. 2A, an air inlet which may be a side air inlet 80A or 80B formed in the left rear quarter panel 76A or right rear quarter panel 76B, respectively, or a rear air inlet 82 formed in rear panel 78 permits outside air to flow across or through the radiator module 30 for cooling thereof. As used herein "rear quarter panel" means side body structure located generally between a vehicle side door and a rear face of the vehicle. "Rear panel" includes any vehicle body structure establishing a generally rearward facing surface on the vehicle. Those skilled in the art readily understand the meaning of the terms "rear quarter panel" and "rear panel." Referring again to FIG. 1, radiator module fans 66A and 66B direct the air flow through the air inlet and across the radiators 62 and 64 and then exhaust the air below the vehicle 10. By exhausting air at the relatively low pressure area beneath the vehicle, requisite air flow may be accomplished with smaller fans than would be necessary if the air flow was exhausted at a higher pressure area. The relative low pressure region may be enhanced with an air dam or other aerodynamic device, which further reduces pressure when the vehicle is moving.

Substantially Separate Low Temperature and High Temperature Cooling Circuits

Referring again to FIGS. 2A-2B, the rear-dedicated cooling system 56 is sub-divided into two separate cooling circuits, a low temperature cooling circuit 68 and a high temperature cooling circuit 70. The low temperature cooling circuit 68 includes the coolant flow passages 58, the battery coolant pump 60, the traction battery 20 and the battery radiator 62. The high temperature cooling circuit 70 includes a high temperature coolant pump 72 operable for maintaining appropriate coolant flow in high temperature coolant flow passages 74 which route coolant in the high temperature cooling system or circuit 70. The high temperature cooling circuit 70 further includes the distribution unit 22, the power inverter modules 24A, 24B, the auxiliary power modules 26A, 26B, the electric traction wheel motors 18A, 18B and the rear traction radiator 64 as well as, the high temperature coolant flow passages 74. Both the low temperature cooling circuit 68 and the high temperature cooling circuit 70 also include the air inlet which may be formed in the left or right rear quarter panel 76A, 76B, respectively, or in the rear panel 78. For example, air inlet 80A may be formed in the left rear quarter panel and/or air inlet 80B may be formed in the right rear quarter panel 76B, respectively. Alternatively or in addition, rear panel air inlet 82 may be formed in the rear panel 78. An air inlet may also be formed in the vehicle roof (not shown) and routed through pillar structure to the radiator module 30. Regardless of which air inlet (e.g., 80A, 80B or 82) is selected, the same air inlet may be used to provide cooling air flow to cool the battery radiator 62 and the rear traction radiator 64 of the high temperature and low temperature cooling circuits 68, 70, respectively. Location of the air inlet in any of these rear locations may improve vehicle aerodynamic drag by keeping the slipstream attached to the vehicle longer, thereby improving airflow separation characteristics and reducing drag.

From FIG. 2A, it is apparent that the high temperature cooling circuit 70 and the low temperature cooling circuit 68 maintain separate coolant flow passages 58, 74. A coolant flow reservoir 84 is in fluid communication with both the low temperature coolant flow passages 58 as well as the high temperature coolant flow passages 74 as indicated by the dashed connection passages 86. Although the reservoir 84 is in fluid communication with both the low temperature and high temperature coolant flow passages 58, 74, respectively, intermixing of the relatively low temperature coolant flow through low temperature coolant flow passages 58 with the relatively high temperature coolant flowing through high temperature coolant flow passages 74 is minimized in that minimal flow passes through the reservoir 84. By substantially separating the high temperature cooling circuit 70 from the low temperature cooling circuit 68, the battery radiator 62 and the rear traction radiator 64 may be optimally sized for appropriate and efficient cooling of heat-generating components in the low temperature and high temperature circuits 68, 70, respectively.

Front-Dedicated Cooling System

A separate front-dedicated cooling system 90 is also employed on the vehicle 10 for cooling of the heat-generating components located in the frontward portion 14 discussed with respect to FIG. 1 above. Like the rear-dedicated cooling system 56, the front dedicated cooling system 90 may include a separate high temperature frontward cooling circuit 92 and low temperature frontward cooling circuit 94 (having flow passages indicated by heavier lines than the flow passages of the high temperature circuit 92). A front structure air inlet 96 is formed in a front face 98 of the vehicle 10. A grille 100 represented by dashed lines in the front structure air inlet 96 may be employed. Air flow through the air inlet 96 is across or through the stack radiator 50 for cooling thereof via a stack radiator fan 99A. Air naturally forced through the air inlet 96 during forward motion of the vehicle also aids in cooling. Left and right radiators 52, 54 are preferably cooled via separate air flow fans 99B, 99C than that used to cool the central stack radiator 50 (i.e., the left and right radiators 52, 54 are preferably not provided with cooling air flow via the air inlet 96) but rather have their own separate cooling air paths to maximize thermal efficiency. The speed of each of the fans 66A, 66B, 99A, 99B and 99C may be individually controlled to provide optimal cooling based upon overall vehicle conditions (such as vehicle load) or upon conditions specific to the cooling circuit and components affected by each fan.

Separate high temperature and low temperature front cooling system reservoirs 91, 93 may be employed to insure separation of coolant flow in the high temperature frontward cooling circuit 92 and the low temperature frontward cooling circuit 94, respectively. Additionally, a high temperature coolant pump 95 and a low temperature coolant pump 97 are employed to maintain appropriate coolant flow in the high temperature and low temperature frontward cooling circuits 92, 94, respectively.

Preferably, the front-dedicated cooling system 90 is not in fluid communication with the rear-dedicated cooling system 56. That is, there is no significant shared coolant or cooling air flow between the two systems. By providing a radiator module 30 in the rearward portion 16 and structuring the coolant flow passages 58 and 74 so that they are in thermally significant flow communication only with rearward-located heat-generating components, as well as by providing a rearward air inlet (80A, 80B or 82), a self-contained rear-dedicated cooling system 56 that enables flexible placement of the radiator module 30 in close packaging arrangement with the rearward portion heat-generating components is provided. Thus, travel distances for coolant flow in coolant flow passages as well as for air flow over the heat-dissipating components are minimized, thus, decreasing component size and minimizing overall addition to vehicle weight.

Rear Air Duct

Figure 3:
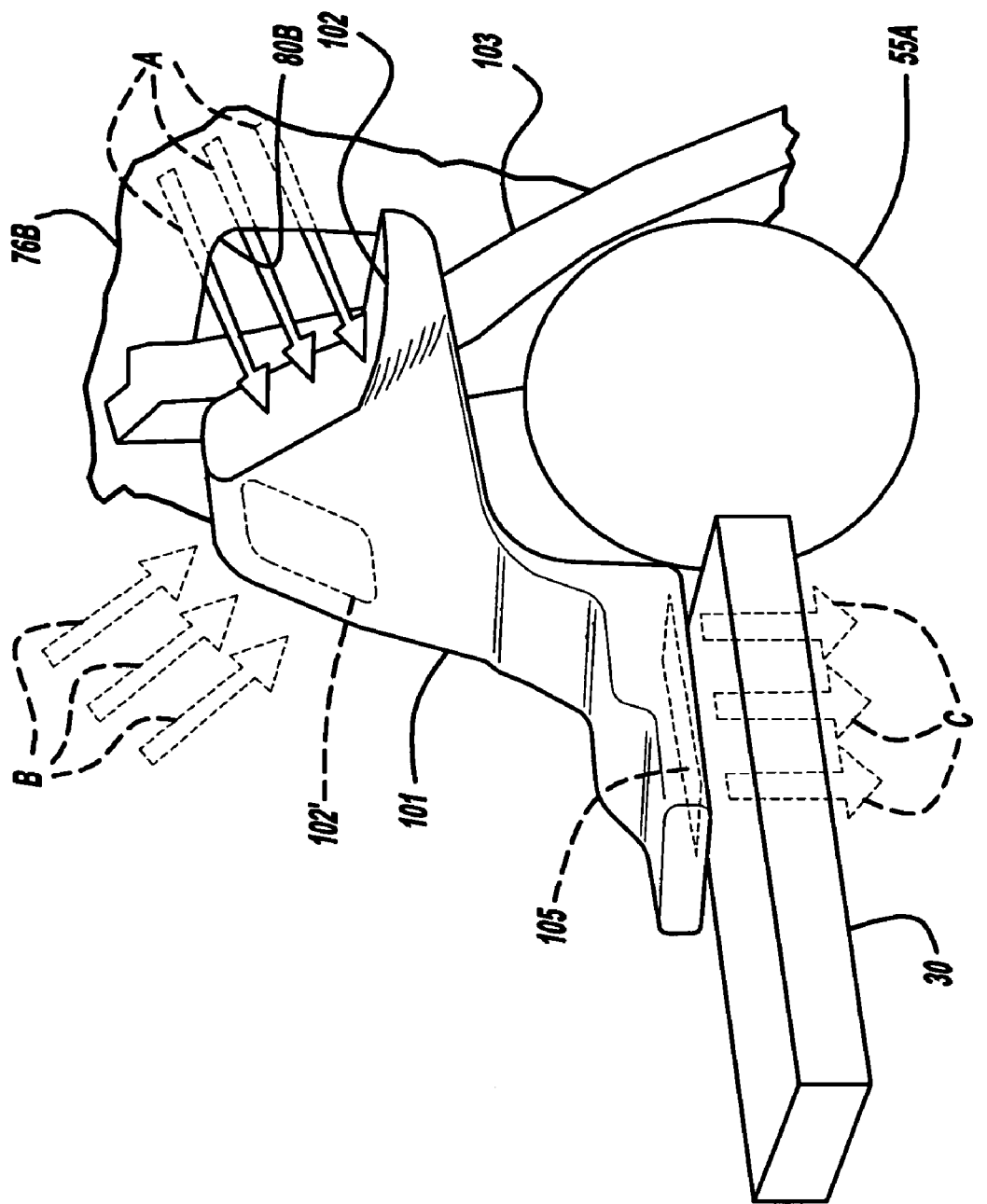
FIG. 3 is a schematic perspective illustration in partial phantom view of a rearward portion air inlet included in the rearward portion cooling system of FIG. 2A.

Referring to FIG. 3, a duct 101 having a duct opening 102 cooperates with the air inlet 80B formed in the left rear quarter panel 76B to receive airflow indicated by arrows A. Support frame 103 is also visible. An alternate duct opening 102' may be employed. The alternate duct opening 102' receives air from an alternate inlet (not shown) in a rear face of the vehicle, as indicated by arrows B. Alternatively, the duct opening 102 may function independently of an air inlet formed in vehicle body structure. For instance, if the rear quarter panel 76B was not formed with air inlet 80B, the duct opening 102 may extend below the rear quarter panel 76B and take in outside air from that location. Also alternatively, the duct inlet may be forward-facing. Outside air is pulled through the duct 101 by the cooling fans 66A, 66B of the radiator module 30 (fans shown in FIG. 1) to flow from a duct outlet 105 through the radiator module 30 for cooling thereof. The air is exhausted to the relatively low pressure space below the vehicle (as shown by phantom arrow(s) C extending below the radiator module 30). Preferably, a second symmetrical duct (not shown) functions similarly to cool the right portion of the radiator module 30. Location of the air path in a low pressure region beneath the vehicle improves cooling airflow potential.

Method of Cooling

Figure 4:
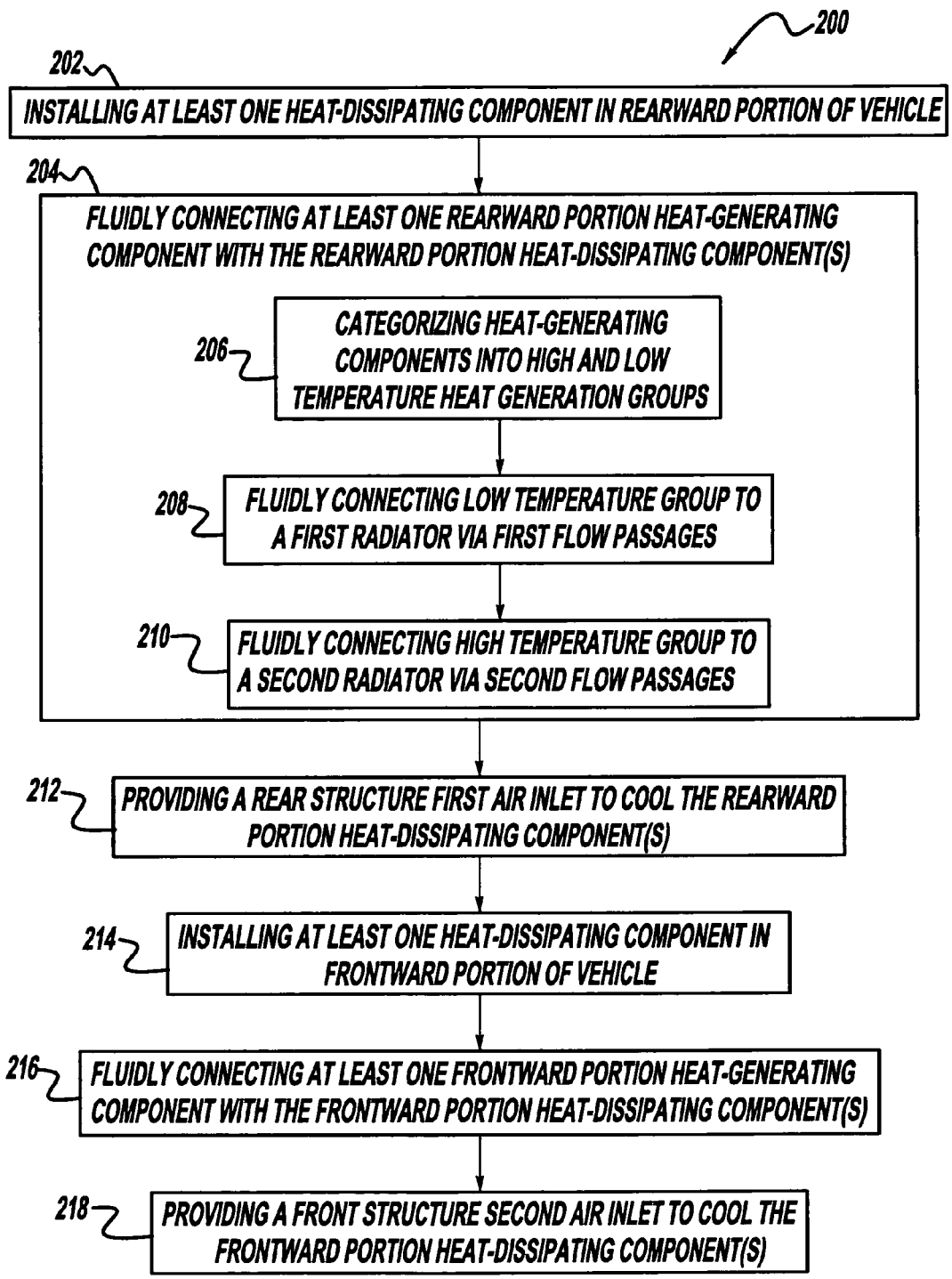
FIG. 4 is a flow diagram illustrating a method of cooling vehicle components.

Referring now to FIG. 4, a method of cooling vehicle components 200 is provided by the vehicle 10 described above. The method includes installing 202 at least one heat-dissipating component in the rearward portion of the vehicle. The method further includes fluidly connecting 204 at least one rearward portion heat-generating component with the rearward portion heat-dissipating component(s). The fluid connection is accomplished by coolant flow passages such as passages 58 and 74 described with respect to FIG. 2A. The method 200 optionally allows for the creation of separate high temperature and low temperature cooling flow circuits within a rear-dedicated cooling flow system. For instance, step 204 may include optionally categorizing heat-generating components 206 into high and low temperature heat generation groups. After the categorizing step 206, step 204 optionally includes fluidly connecting the first, low temperature group to a first radiator 208 via first flow passages. Similarly, step 204 optionally includes fluidly connecting the second, high temperature group to a second radiator 210 via second flow passages. By performing the categorizing step 206 as well as the fluid connecting steps 208 and 210, separate low temperature and high temperature cooling circuits such as cooling circuits 68 and 70 described with respect to FIG. 2A are created.

The method 200 further includes providing a rear structure first air inlet 212. The first air inlet cools the rearward portion heat-dissipating component(s). The method 200 optionally includes installing at least one heat-dissipating component in a frontward portion of the vehicle 214. Also optionally, the method 200 may further include fluidly connecting at least one frontward portion heat-generating component with the frontward portion heat-dissipating component(s) 216. If optional steps 214 and 216 are carried out, then the method 200 may further include providing a front structure second air inlet 218. The front structure second air inlet cools the frontward portion heat-dissipating component(s). The separate frontward portion heat-dissipating components, heat-generating components and air inlets described with respect to FIG. 2A illustrate steps 214, 216 and 218 of the method 200. Within the scope of the invention, the steps of method 200 need not be performed in the order shown in FIG. 4.

In summary, a rear-dedicated cooling system is provided that enables efficient cooling of rearward located heat-generating components. The rear-dedicated system may be subdivided into high temperature and low temperature cooling circuits for further optimization of the cooling system design. Preferably, the rearward dedicated cooling system is not in fluid communication with any frontward portion heat-generating components or frontward portion heat-dissipating components. Also preferably, a separate rearward located cooling air inlet is provided.

While the best modes for carrying out the invention have been described in detail, those familiar with the art to which this invention relates will recognize various alternative designs and embodiments for practicing the invention within the scope of the appended claims.

The invention claimed is:

1. A cooling system for a vehicle including:
   a heat-generating component mounted in said vehicle;
   a heat-dissipating component mounted in said vehicle;
   structure defining coolant flow passages containing coolant, said coolant flow passages being in coolant flow communication with said heat-generating component and said heat-dissipating component to transfer heat therebetween;

structure defining an air inlet in air flow communication with said heat-dissipating component for providing outside air to said heat-dissipating component for cooling thereof;

wherein said heat-generating component, said heat-dissipating component, said coolant flow passages, and said air inlet are located in a normally rearward portion of said vehicle;

another heat-generating component mounted to said vehicle;

another heat-dissipating component mounted to said vehicle;

additional structure defining additional coolant flow passages containing coolant operable to transfer heat between said another heat-generating component and said another heat-dissipating component;

wherein said air inlet is in air flow communication with said another heat-dissipating component for providing outside air to said another heat-dissipating component for cooling thereof;

wherein said another heat-generating component, said another heat-dissipating component, and said additional coolant flow passages are located in the normally rearward portion of said vehicle; and wherein said coolant flow passages and said additional coolant flow passages interconnect only via a common coolant flow reservoir, with coolant flow not required to pass through said reservoir in circulating through said respective cooling flow passages and additional cooling flow passages, thereby minimizing coolant flow mixing therebetween.

2. The cooling system of claim 1, wherein said heat-dissipating component is a radiator disposed generally horizontally.

3. The cooling system of claim 1, wherein said structure defining an air inlet is one of a vehicle rear quarter panel and a rear panel.

4. The cooling system of claim 1, wherein said outside air provided to cool said heat-dissipating component is exhausted beneath said vehicle after cooling of said heat-dissipating component.

5. The cooling system of claim 1, wherein said heat-generating component is one of a rear traction motor, a battery for powering said rear traction motor, a power module interfacing with said battery to provide power to said traction motor, a power inverter module for inverting battery power between direct current and alternating current, and a distribution unit for distributing power to said rear traction motor.

6. The cooling system of claim 5, wherein said heat-dissipating component is a radiator module having a first radiator for dissipating heat generated by said battery, a second radiator for dissipating heat generated by said rear traction motor and at least one fan operable for pulling said outside air from said air inlet through said first and second radiators for cooling thereof.

7. The cooling system of claim 6, wherein said first and second radiators are generally horizontally stacked above said at least one fan.

8. The cooling system of claim 1, wherein said heat-generating component, said heat-dissipating component, said coolant flow passages and said air inlet define a first cooling circuit;

wherein said heat-generating component is a battery; and wherein said battery receives power from one of a libel cell and an internal combustion engine not located in said normally rearward portion and cooled via a second cooling circuit not in substantial coolant flow communication with said first cooling circuit.

9. The cooling system of claim 8, wherein outside air is provided to said second cooling circuit for cooling thereof via another air inlet not located in said normally rearward portion of said vehicle.

10. The cooling system of claim 1, wherein said heat-generating component, said heat-dissipating component, said structure defining coolant flow passages and said air inlet define a first cooling circuit;

wherein said vehicle has:

a third heat-generating component and a third heat-dissipating component both mounted in said vehicle;

other structure defining different coolant flow passages operable to transfer heat between said third heat-generating component and said third heat-dissipating component;

another structure defining another air inlet operable for providing outside air to said third heat-dissipating component for cooling thereof, said third heat-generating component, said third heat-dissipating component, said different coolant flow passages and said another air inlet being located in a normally frontward portion of the vehicle and defining a second cooling circuit, said normally rearward portion and said normally frontward portion together substantially defining said vehicle; and wherein said first and second cooling circuits are not in substantial coolant flow communication with one another so that the respective heat generating component of each is cooled independently from the other.

11. The cooling system of claim 10, wherein said third structure defining another air inlet includes a front grille disposed at a generally forward face of said vehicle, wherein said structure defining an air inlet includes one of a rear quarter panel and a rear panel.

12. The cooling system of claim 10, wherein said vehicle is one of a fuel cell powered vehicle and a hybrid electromechanical powered vehicle and said third heat-generating component is one of a fuel cell and an internal combustion engine, respectively.

13. The cooling system of claim 1, wherein said coolant flow passages are characterized by relatively higher temperature coolant flow than said additional coolant flow passages.

14. The cooling system of claim 1, wherein said heat dissipating component and said another heat dissipating component are generally horizontally stacked.

* * * * *